United States Patent
Lee et al.

(10) Patent No.: US 6,269,202 B1
(45) Date of Patent: Jul. 31, 2001

(54) HIGHLY TEMPERATURE STABLE FILTER FOR FIBEROPTIC APPLICATIONS AND SYSTEM FOR ALTERING THE WAVELENGTH OR OTHER CHARACTERISTICS OF OPTICAL DEVICES

(75) Inventors: Ho-Shang Lee; Ming-Ching Lo, both of El Sobrante; Brian Chiang, Berkeley, all of CA (US)

(73) Assignee: Dicon Fiberoptics, Inc., Berkeley, CA (US)

( * ) Notice: Subject to any disclaimer, the term of this patent is extended or adjusted under 35 U.S.C. 154(b) by 0 days.

(21) Appl. No.: 08/948,792

(22) Filed: Oct. 10, 1997

(51) Int. Cl.[7] ..................................................... G02B 6/28
(52) U.S. Cl. ............................................................ 385/24
(58) Field of Search ................................. 359/124, 127, 359/358, 359, 589, 296, 886, 887; 385/24, 27, 33, 11

(56) References Cited

U.S. PATENT DOCUMENTS

| | | | |
|---|---|---|---|
| 3,614,188 | * 10/1971 | Seeley | 359/359 |
| 3,949,259 | * 4/1976 | Kostlin et al. | 313/112 |
| 4,548,478 | 10/1985 | Shirasaki. | |
| 4,949,005 | * 8/1990 | Parham et al. | 313/112 |
| 5,138,219 | * 8/1992 | Krisl et al. | 313/112 |
| 5,266,238 | * 11/1993 | Haacke et al. | 359/885 |
| 5,463,494 | * 10/1995 | Hobrock | 359/359 |
| 5,579,420 | * 11/1996 | Fukushima | 385/11 |
| 5,859,717 | * 1/1999 | Scobey et al. | 359/124 |

* cited by examiner

Primary Examiner—Akm E. Ullah
(74) Attorney, Agent, or Firm—Skjerven Morrill MacPherson LLP

(57) ABSTRACT

The optical thickness of an optical device such as an interference filter or optical isolator is altered by applying stress thereto. This changes the frequency or isolation characteristics of the filter or isolator. The two sides of the device may be clamped to a member having a temperature expansion coefficient which is different from that of the device in order to apply tension or compression to the device in response to temperature changes. In this manner, the shifts in optical characteristics of the device due to temperature change is at least partially cancelled by the shifts in optical characteristics induced by stress applied by the member.

23 Claims, 6 Drawing Sheets

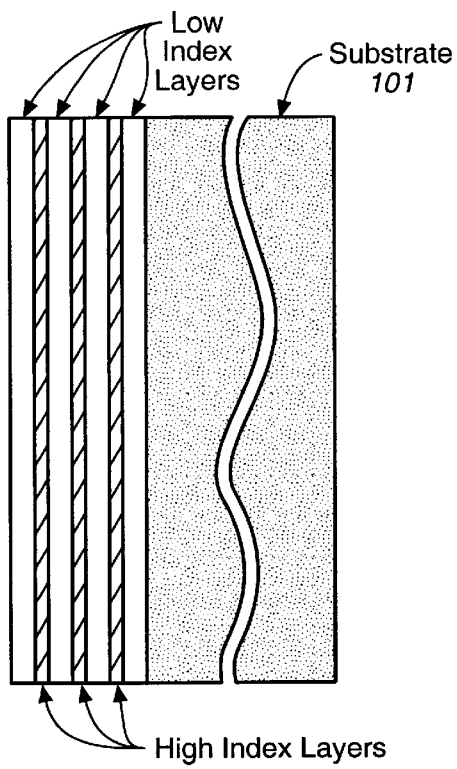
FIG._1A
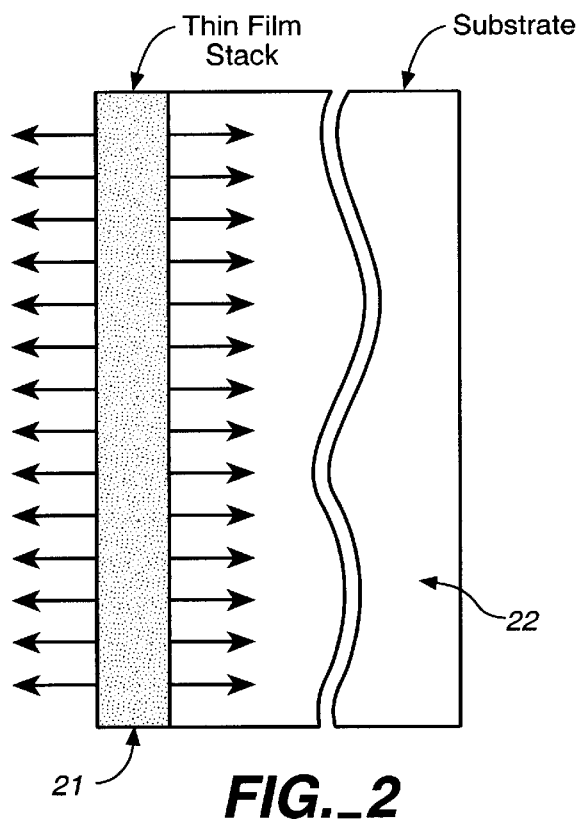
FIG._2
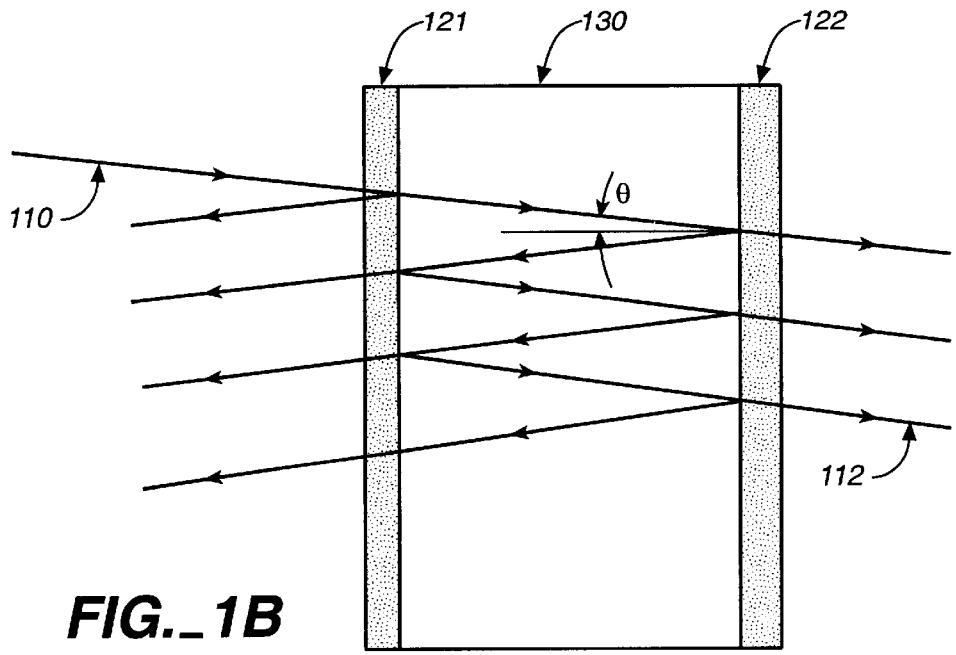
FIG._1B

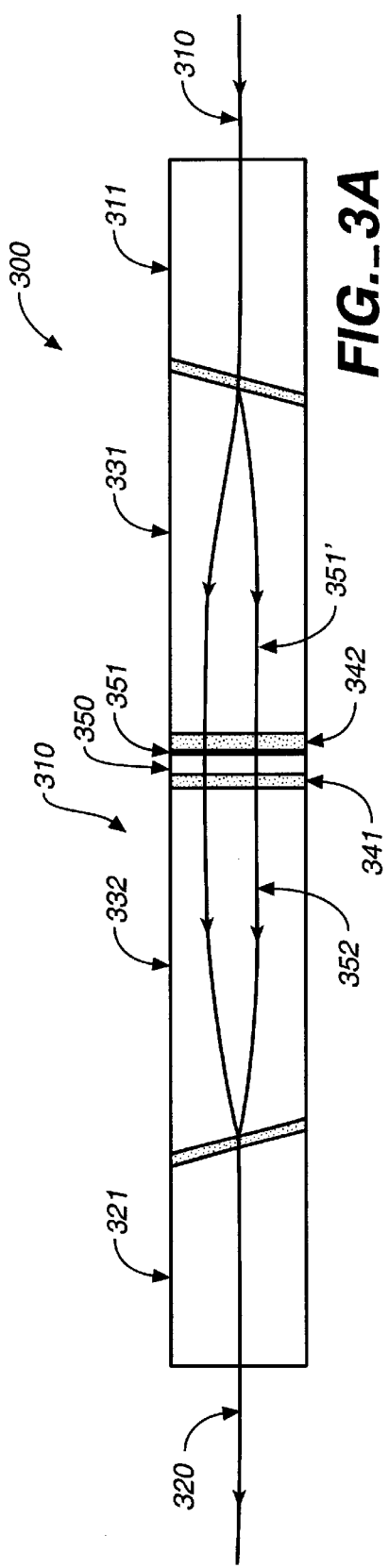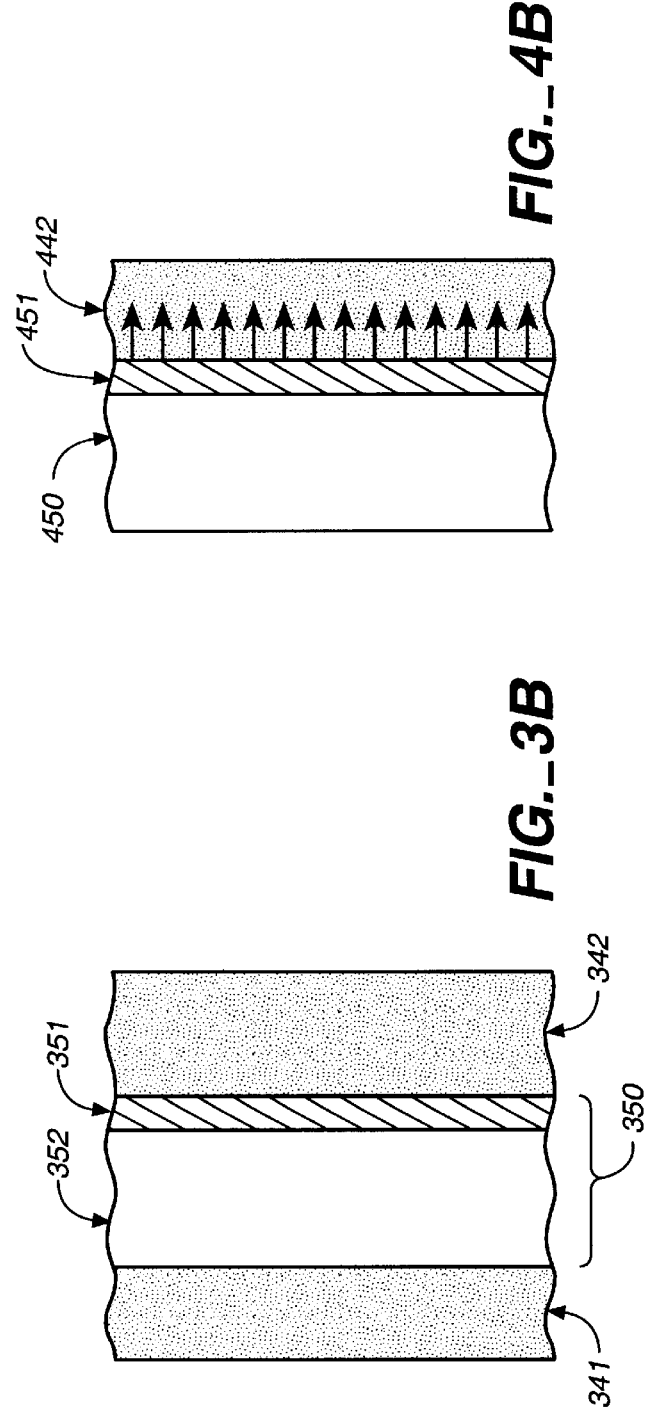

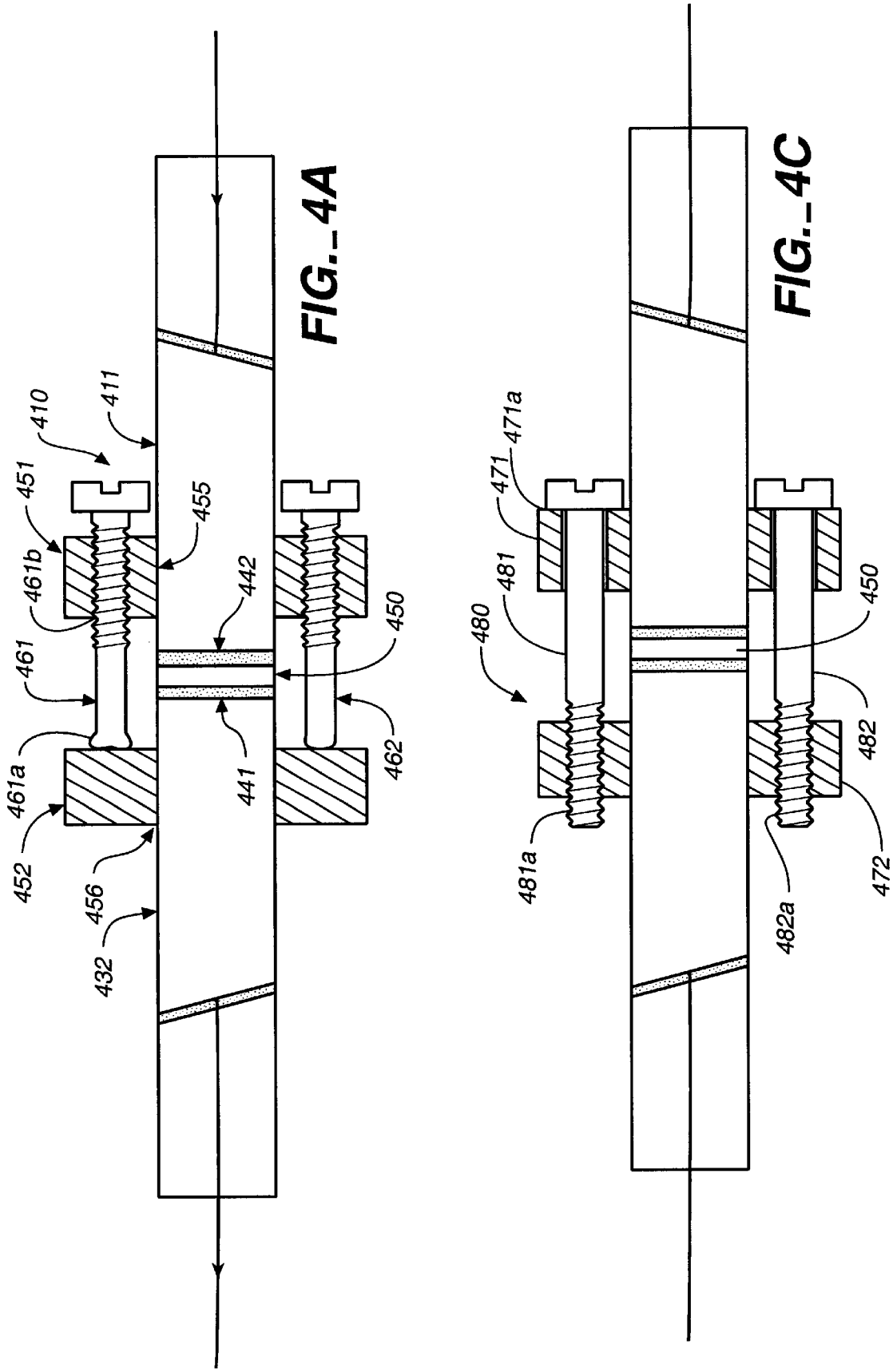

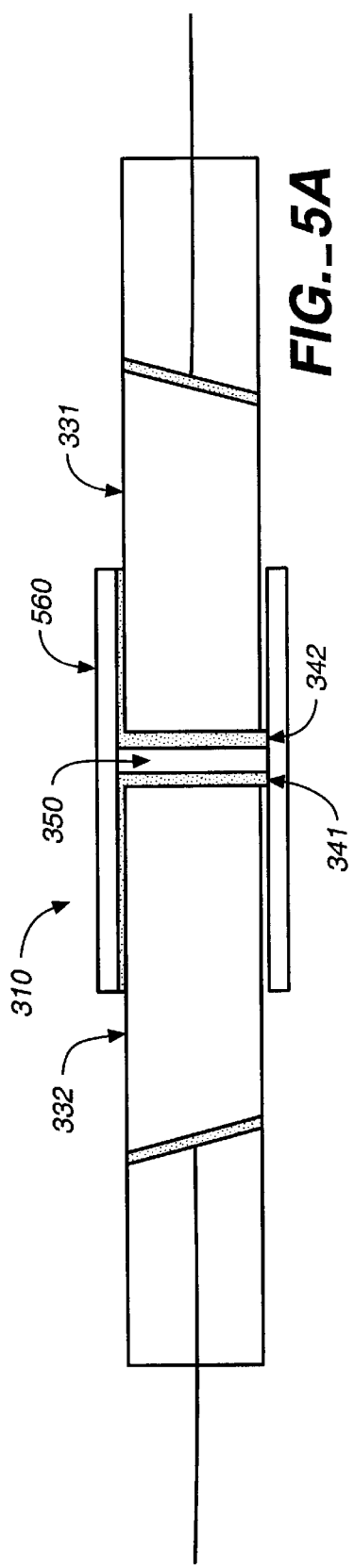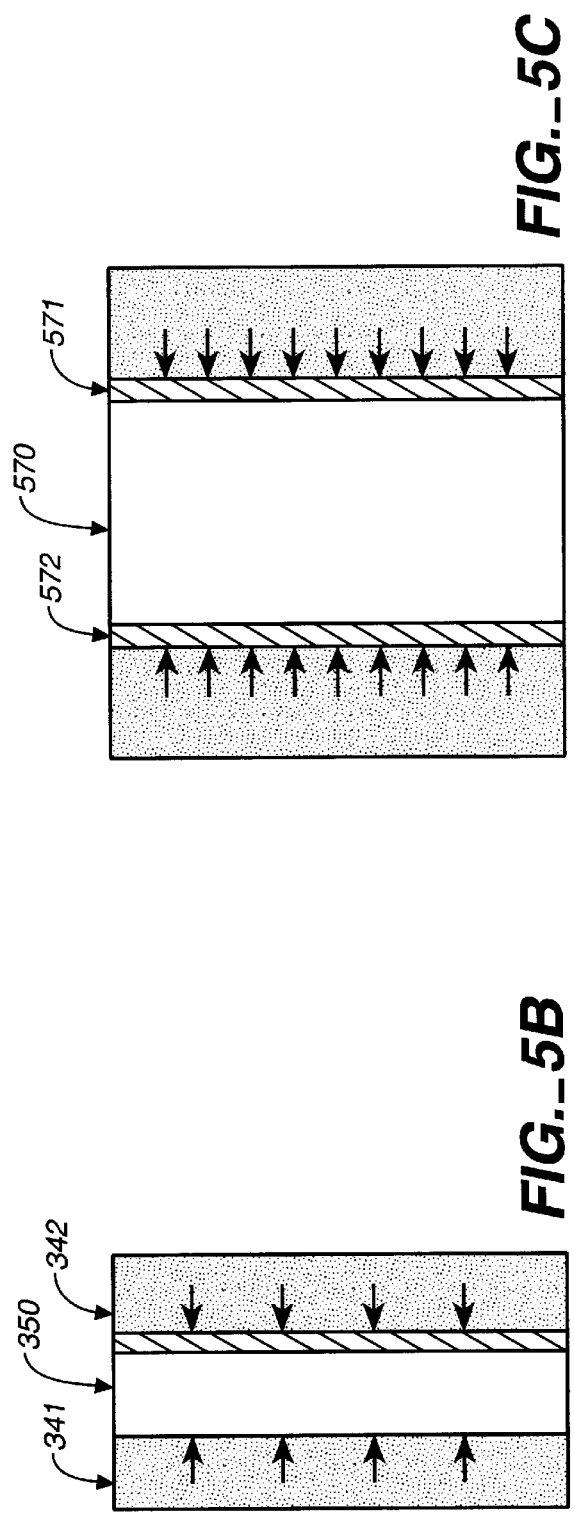

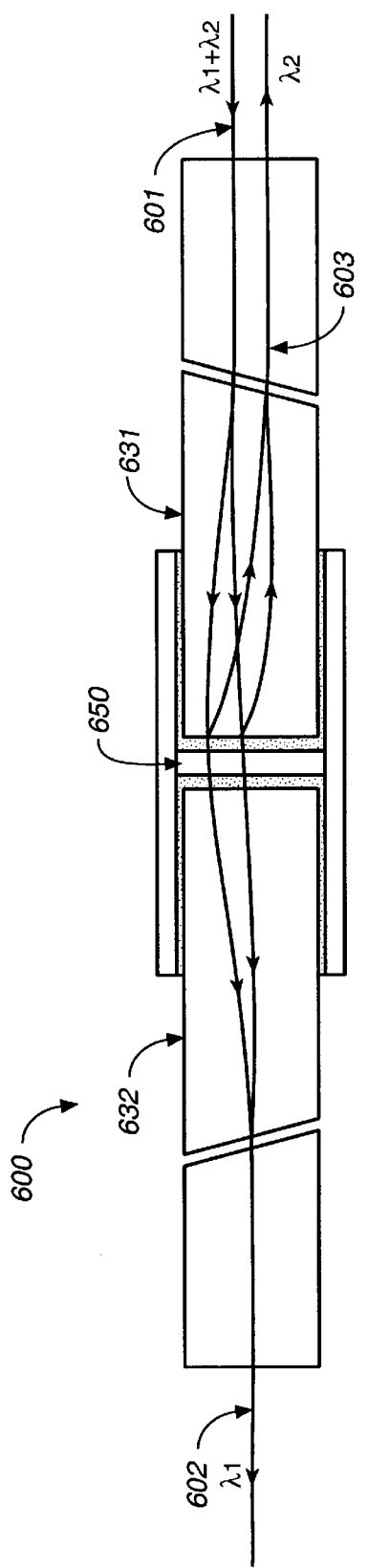
FIG._6
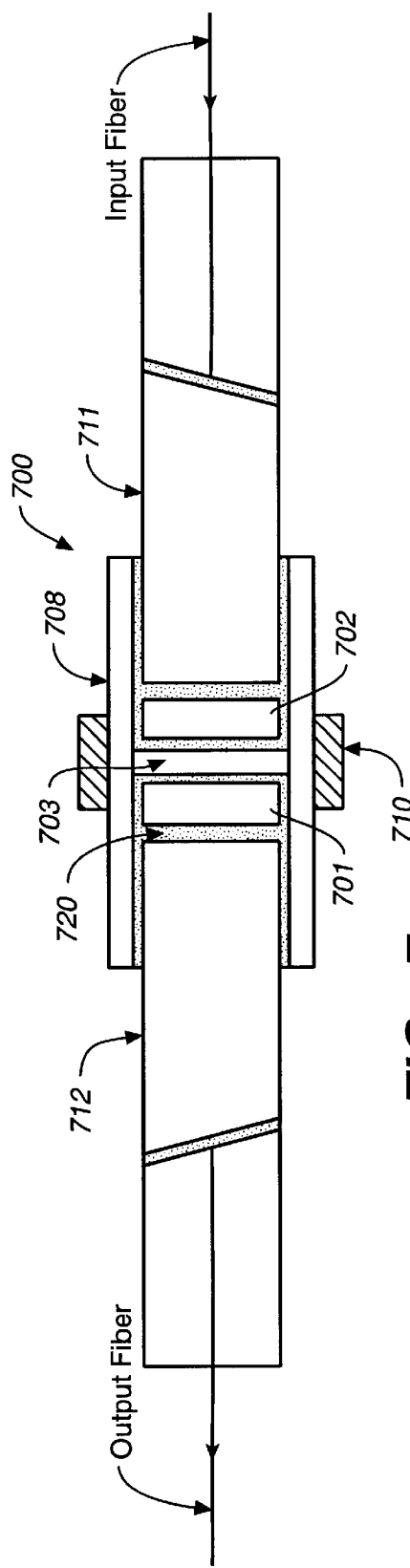
FIG._7

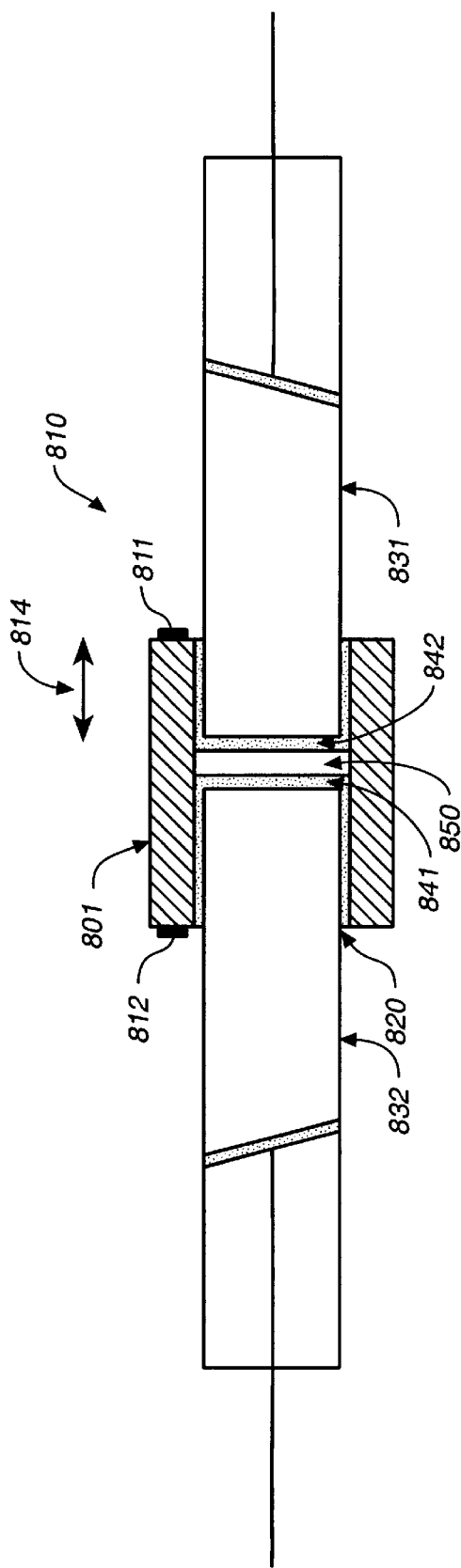
FIG._8

HIGHLY TEMPERATURE STABLE FILTER FOR FIBEROPTIC APPLICATIONS AND SYSTEM FOR ALTERING THE WAVELENGTH OR OTHER CHARACTERISTICS OF OPTICAL DEVICES

BACKGROUND OF INVENTION

This invention relates to optical communication devices and in particular to a fiber optic filter useful in wavelength division multiplexing and demultiplexing. The invention is particularly useful for reducing the wavelength shift of filtering devices against the temperature change. This invention also has applications in altering the wavelength or other optical characteristics of filters and other optical devices.

In recent years, optical fiber technology for telecommunication has progressed rapidly. While the theoretical transmission capacity of the single mode optical fiber has been recognized in the industry as extremely high from the day such fiber was introduced, much of the capacity has not been utilized. For the increasing demand for bandwidth, such as in the transmission of video images and graphics, much attention has been directed lately toward the maximal utilization of the bandwidth of the single mode fiber. Wavelength division multiplexing (WDM) is one of the most viable schemes of maximizing bandwidth utilization of single mode fiber.

In a WDM system, multiple signal sources emitting at different wavelengths, $\lambda_1, \lambda_2, \ldots, \lambda_n$, are coupled into the same single-mode fiber by means of a multiplexer. After the signals of different wavelengths are transmitted through the fiber to a desired destination, the multiple wavelength signals carried by the respective multiple wavelengths must then be separated by means of a demultiplexer into separate optical channels, each wavelength being carried by a different channel to a detector.

WDM based systems have evolved rapidly from early two channel systems to the current 16 channel system. International Telecommunication Union (ITU) has even proposed a 45 channel system utilizing wavelength range from 1533 to 1565 nm with channel spacing of 100 GHz (about 0.8 nm). Furthermore, a WDM system of channel spacing of 50 GHz is being fostered. It challenges optical component manufacturers to provide ultra-narrow bandwidth filters with highly stable pass wavelength against environmental temperature change. This invention is related to the enhancement of the temperature stability of the pass band of the filtering devices.

WDM multiplexers and demultiplexers can be made by employing thin film filters, diffraction grating, waveguides, Bragg in-fiber grating. The WDM employing thin film filters is widely used because of its excellent optical characteristics such as lower loss and higher channel isolation comparing with other technologies.

Filters are usually formed by a stack of thin films made by the deposition processes. The control of center wavelength accuracy of the filter during the deposition process and its stability against temperature change are extremely challenging, particularly for the dense WDM such as 100 GHz spacing system. The shift of the center wavelength under temperature change of 100 degree C. is required to be within 0.1 nm or smaller to prevent the shift from interfering with the adjacent channels.

The optical thickness of thin films responds to the temperature change and therefore the location of the center wavelength shifts with the temperature. The temperature coefficient of the center wavelength shift depends on the film structure, film materials, deposition process and others. Lower temperature coefficient is desired. The typical temperature coefficient of the filter made by the state of art deposition process ranges from 0.003 to 0.01 nm° C. A temperature change of 100° C. would cause a wavelength shift of about 0.3 nm to 1 nm, which is too large for dense WDM applications.

It is therefore desirable to introduce an improved filter system with a stable characteristic frequency over a large temperature range.

SUMMARY OF THE INVENTION

This invention is based on the observation that optical characteristics such as frequency or wavelength of a filter can be altered by changing the stress in the filter. Changing the stress in the filter alters the optical thicknesses of the thin film(s) in the filter, thereby also changing its frequency characteristic. If the change in stress is so as to reduce or cancel the wavelength shift caused by thermal expansion or contraction of the thin films, a filter with stable wavelength characteristic over a range of temperatures is achieved.

In this application, the characteristic frequency of an optical interference filter can include the center frequency of a band pass filter and an edge frequency of a low pass or high pass filter.

One aspect of the invention is directed towards an apparatus for filtering an optical signal, comprising an optical interference filter having a characteristic frequency and means for applying stress to the filter to compensate for effects of temperature on the characteristic frequency.

Another aspect of the invention is directed towards a method for filtering an optical signal, comprising providing an optical interference filter; causing change of stress in the filter and passing said optical signal through the filter.

One more aspect of the invention is directed towards a method for making an optical filter, comprising providing an optical assembly including an optical interference filter having two sides, said filter connected on one side to a first GRIN lens structure and on another side to a second GRIN lens structure; passing the assembly through a tube having a temperature expansion coefficient that is different from that of the assembly and attaching one side of the tube to the first lens structure and another side of the tube to the second lens structure.

Yet another aspect of the invention is directed towards a wavelength division multiplexer/demultiplexer, comprising an optical assembly that includes an optical interference filter having two sides and two GRIN lens structures, said filter connected on one side to a first GRIN lens structure and on another side to a second GRIN lens structure; means for applying stress to the filter to alter a characteristic frequency of the filter; one or more input optical channels carrying light of one or more wavelengths to the assembly and one or more output optical channels carrying light of one or more wavelengths from the assembly.

An additional aspect of the invention is directed towards an optical isolator assembly, comprising an optical isolator; an input optical channel supplying light to the isolator; an output optical channel carrying light from the isolator and means for applying stress to the isolator to alter the isolation characteristic of the isolator.

Yet one more aspect of the invention is directed towards an optical assembly, comprising an optical device having an optical characteristic that changes with stress in the device; an input optical channel supplying a collimated light beam to the device; an output optical channel carrying a collimated light beam from the device and means for applying stress to the device to alter the optical characteristic of the device.

Another aspect of the invention is directed to a method for optical processing, comprising providing an optical device having an optical characteristic that changes with stress in the device; supplying a collimated light beam to the device; delivering a collimated light beam from the device; and applying stress to the device to alter the optical characteristic of the device.

Still one more aspect of the invention is directed towards an optical assembly, comprising an optical device having an optical characteristic that changes with stress in the device; a piezoelectric member connected to the device and means for applying a voltage to the member to alter the optical characteristic of the device.

BRIEF DESCRIPTION OF THE DRAWINGS

FIG. 1A is a schematic view of an interference filter useful for illustrating the invention.

FIG. 1B is a schematic view of an etalon useful for illustrating the invention.

FIG. 2 is a schematic view illustrating tension stress applied to an interference filter useful for illustrating the invention.

FIG. 3A is a schematic view of a fiberoptic filter assembly where no stress is imposed.

FIG. 3B is an enlarged view of a portion of the interference filter element in FIG. 3A.

FIG. 4A is a partly schematic and partly cross-sectional view of a fiberoptic filter assembly where stress is imposed on the interference filter to illustrate an embodiment of the invention.

FIG. 4B is a schematic view of a portion of the interference filter of FIG. 4A.

FIG. 4C is a partially cross-sectional and partially schematic view of a fiberoptic filter assembly where stress is imposed on the filter to illustrate another embodiment of the invention.

FIG. 5A is a partially schematic and partially cross-sectional view of a fiberoptic filter assembly where stress is imposed on the filter by means of a tube member to illustrate the preferred embodiment of the invention.

FIG. 5B is a cross-sectional view of one embodiment of a portion of the interference filter of FIG. 5A.

FIG. 5C is a cross-sectional view of an alternative etalon construction of the filter in FIG. 5A.

FIG. 6 is a partially cross-sectional and partially schematic view of a WDM device employing the design of FIG. 6 to illustrate an application of the invention.

FIG. 7 is a partially cross-sectional and partially schematic view of an optical isolator assembly to illustrate another embodiment of the invention.

FIG. 8 is a partially cross-sectional and partially schematic view of a fiberoptic assembly employing a piezoelectric member to illustrate yet another embodiment of the invention.

For simplicity in description, identical components are referred to in this application by the same numerals.

DETAILED DESCRIPTION OF THE PREFERRED EMBODIMENT

FIG. 1A illustrates a thin film filter. Typically, two materials with different refractive indices are alternatively deposited to a piece of substrate 101. A stack of thin films consisting of alternating materials forms the filtering mechanism. By varying the layer structure, thickness, material and other factors, a wide variety of filters are designed to serve different filtering purposes. The substrate material is typically glass.

FIG. 1B is a cross-sectional view of an etalon to illustrate the basic working principle of Fabry-Perot interferometer, which forms the basis of Fabry-Perot interference filter. A Fabry-Perot interferometer relies on the interference of multiple reflected beams. As shown in FIG. 1B, incident light beam 110 experiences multiple reflections at each of the two coated reflective surfaces, 121 and 122, respectively. The spacer 130 defines the optical thickness of the etalon. Light beam 110 with a flat broadband spectrum entering the etalon emerges as light beam 112 with a spectrum having multiple peaks at the exiting side of the etalon. For details, please refer to U.S. patent application Ser. No. 08/905,087, "Frequency sorter, and Frequency locker for Monitoring Frequency shift of Radiation Source" by G. Chen et al.

FIG. 2 shows a filter coating under tension stress. The thin film stack 21 is deposited onto the surface of the substrate 22. Mechanical stress a is applied to the thin film stack 21. The methods for creating the stress on the stack are described below. The optical thickness of thin film responds to both mechanical stress and thermal expansion. The change of optical thickness induces the shift of the center or edge wavelength of the thin film stack. In the elastic regime, the relation of change can be mathematically expressed as follows:

Equation 1:

$$\Delta\lambda = C_S(\sigma - \sigma_0) + C_T(T - T_0)$$

where $\Delta\lambda$: the shift of center wavelength in nanometer.

$C_S$: coefficient of wavelength shift with respect to stress $C_T$: coefficient of wavelength shift with respect to temperature change $\sigma$: unidirectional stress applying on the film, positive for tension and negative for compression $\sigma_0$: Preloaded stress on the thin film filter at room (reference) temperature T: temperature $T_0$: room (reference) temperature By the above relation, the present invention proposes means to produce change in stress in response to the temperature change such that the first term in the right hand side of Equation (1) tends to cancel out the second term in the same right hand side. Therefore the center or edge wavelength of the filter may become immune to temperature changes.

FIG. 3A indicates a fiber optic filter assembly 300 where stress has not been externally imposed on the filter element. A filter element 350 having two sides is bonded by optical cement 341 and 342 to and between two GRIN lenses 332 and 331, on each of the two sides as shown in FIG. 3A. FIG. 3B is a blow-up view of the filter location. The thin film coating 351 is deposited to transparent substrate 352 to form element 350. The GRIN lens 331 is used to collimate the input optical power from the input fiber 310, which is embedded in the center of a glass ferrule 311. The collimated beam 351' goes through the filter 350 and is then refocused by the other GRIN lens 332 back to the output optical fiber 320. In this optical assembly, the filter element 350 and the adjacent cement layers 341 and 342 are free to expand under temperature change such that there is no external mechanical stress on the filter element.

FIG. 4A indicates a fiber optic filter assembly with a mechanism of imposing mechanical stress to filter. A filter element 450 having two sides is bonded by optical cements 441 and 442 between two GRIN lenses 411 and 432, each lens bonded to one of the two sides of the filter element. The integration of the filter 450 and two GRIN lenses 432 and 411 is referred to herein as the optical assembly 410. Two metal rings 451 and 452 are bonded to the lenses or lens structures, at appropriate locations of the circumferences of GRIN lenses 411 and 432, respectively, by high-strength adhesive, welding or soldering. It is important in this invention to select the set screws 461, 462 as well as metal rings 451 and 452, so that these are made of materials having thermal expansion coefficients (TEC) that are different from, and preferably smaller than, that of the optical assembly 410. For a typical thin film filter, the coefficient $C_T$ in Equation (1) is positive and in the range of 0.00:3 to 0.01 nm° C. If the TEC of optical assembly 410 is higher than that of the set screws 461 and 462, the optical assembly 410 contracts more than set screws 461 and 462 as the temperature decreases, such that the optical assembly is subject to tension. The long end shift of the center or edge wavelength induced by the tension therefore reduces or cancels out the short-end shift of wavelength by the thermal contraction.

The set screws 461 and 462 may also be used to apply a preloaded tension stress $\sigma$ in Equation (1) at the ambient temperature on the filter 450. It is also important to note that, in the embodiment of FIG. 4A, preloaded stress can be applied to adjust the center or edge wavelength at room temperature to the long end. It makes the filter tunable by the mechanical stress. FIG. 4B shows a blow-up view of filter under unidirectional tension stress.

As shown in FIG. 4A, the set screw 461 has an end 461a that abuts ring 452. Set screw 461 passes through a hole in ring 451, and has a threaded portion 461b that matches the complimentary threaded portion of the surface of the hole in ring 451. Set screw 462 and rings 451, 452 are related in a manner similar to that of screw 461 and the two rings. By turning the set screws 461, 462, a desired amount of tension may be applying to filter 450. Rings 451, 452 need not be complete rings around the two GRIN lenses, but may instead be partial rings around a portion of the lenses; such complete or partial rings or members of other shapes that serve similar functions are referred to herein as collars.

In order for the rings or collars 451, 452 to be fixed in position relative to the two lenses 411, 432, the rings or collars may be attached to the two lenses at desired locations at the circumferences of the lenses by means of a high-strength adhesive, soldering or welding. Where soldering or welding is employed, it may be desirable to first provide a layer or coating of metal at the appropriate locations of the two lenses, to form two lens structures. A soldering or welding material may then be used to connect the rings or collars 451, 452 to the two lens structures at the metal coatings or layers at such locations.

In reference to the fiberoptic assembly 480 of FIG. 4C, instead of applying tension to the interference filter 450, the set screws 481, 482 are connected to the collars 471, 472 in such manner as to apply compression instead. As shown in FIG. 4C, instead of having one end of each of the two the set screws abutting one of the rings or collars, the set screws pass through holes in such rings or collars 471 to engage a surface such as surface 471a which is on the far side facing away from ring or collar 472. The other end 481a, 482a of the two set screws are provided with threaded portions to engage with the complementary threaded portions of the surfaces of the holes in collar 472. As in the embodiment of FIG. 4A, the arrangement of FIG. 4C may be used to apply a preload compression to the filter 450 in order to alter its characteristic frequency. If the set screws 481, 482 and metal rings 471 and 472 are selected so that these are made of materials having thermal expansion coefficients (TEC) that are different from, and preferably smaller than, that of the optical assembly 410, then as the filter assembly tends to expand in response to rising temperatures, the set screws and rings or collars will apply compression to the filter to reduce or cancel out the wavelength shift.

FIG. 5A illustrates another means for imposing mechanical stress on the optical assembly. The optical assembly 310 of FIG. 3A is snugly fed through a metal tubing 560 at the ambient environment. The optical assembly 310 is bonded to the inner wall of the tubing 560 by the high strength adhesive or soldering or welding. The TEC of the tubing is selected to be smaller than that of optical assembly 310. As the temperature increases, the optical assembly 310 expands more than the tubing 560. A compression stress is therefore induced on optical assembly and the filter 350. The reduction of the long-end shift of wavelength due to thermal expansion of thin film is therefore achieved by the compression. If a preloaded stress ao is desired, there are two manufacturing methods available for implementation:

1. A heating during the adhesive curing of optical assembly to the tubing 560. The adhesive is applied at the ambient temperature between the optical assembly 310 and tubing 560. The adhesive is thereafter cured at elevated temperature. As the curing is done and the temperature is cooled down to room temperature, a tension stress is loaded on the optical assembly and the filter 350 because the optical assembly is shrunk more than the tubing 560.

2. A preloaded stress is applied to the optical assembly 310 before or during the bonding (by means of adhesive) at the ambient temperature between the optical assembly 310 and the tubing 560 is completed.

FIG. 5B is the blow-up view of the filter under compression. FIG. 5C shows an etalon under compression. Apparently, the filter 350 in the optical assembly 310 can be replaced by an etalon as explained in FIG. 1B. The optical thickness of the spacer 570 responds to the stress on it and the thermal expansion. Thus, the shift of spectrum line of the etalon also follows Equation (1).

The typical TECs for GRIN lens and optical cement are 10 ppm/° C. and 30–50 ppm° C., respectively. Low TEC materials such as Alloy Invar and Kavar can be used for the tubing 560. The test result from samples of FIG. 5A using Invar for the tubing 560 shows a one-order reduction of the wavelength shift coefficient against temperature change from 0.005 nm/° C. to 0.00035 nm/° C. within the operating temperature range of −20 to 85° C.

FIG. 6 illustrates a wavelength division demultiplexer 600. This device has three optical ports 601, 602 and 603. The optical fiber 601 carries two wavelengths, $\lambda 1$ and $\lambda 2$. The filter 650 allows $\lambda 1$ to pass through and reflects $\lambda 2$. Wavelength $\lambda 1$ is coupled to the optical fiber 602 and $\lambda 2$ to the optical fiber 603 through GRIN lens 631. The stability of passband of the filter 650 against temperature change is desirable in the WDM transmission system. Thus, the methods of inducing changing stress to the thin film filter as indicated above are also applicable to this configuration. If fibers 602, 603 carry input optical wavelengths $\lambda 1$ and $\lambda 2$, then the two wavelengths are multiplexed by device 600 and fiber 601 may be used to collect the multiplexed wavelengths; in such instance, device 600 acts as a multiplexer. Other optical configurations using the changing stress to reduce the thermal expansion effect on the wavelength shift are within the scope of the present invention. It will be evident the invention is applicable where the WDM system employs more than one input and/or output optical channels.

The present invention of applying changing stress to optical devices is also applicable to fiber optic isolators for improving the isolation stability against temperature change. The fiber optic isolator as disclosed in U.S. Pat. No. 4,548,478 by Masataka Shirasaki uses micro-optic components such as garnet and birefringent crystal to isolate the backward light. The garnet is ideally designed to rotate the polarization of the incident beam 45 degrees. However, the rotation ability of the garnet is changed with the temperature change. The rate of change of the rotation ability against temperature change is dependent on the material. According to a data sheet attached hereto as Appendix A, a garnet produced by Mitsubishi International Corporation in New York, N.Y. shows that the rotation angle decreases from 45 degrees to 42 degrees as temperature increases from 25° C. to 75° C. A 3 degree distortion of rotation angle decreases isolation about 9 dB, which is significant. For the garnet from Mitsubishi in the data sheet, an increasing tension stress with temperature is useful to correct (compensate) the shift of garnet against temperature increase. FIG. 7 illustrates a single-stage isolator subject to changing stress. The garnet 703 is sandwiched by optical cement between two wedged birefringent crystals 701 and 702 such as rutile. The wedge angle of the birefringent crystals can range from 1 to 12 degrees. The crystal assembly of 701, 702 and 703 is further sandwiched by optical cement between two GRIN lenses 712 and 711. The integrated assembly of two GRIN lenses and crystal assembly is called optical assembly 700. A non-magnetic tubing 708 is imposed on the outer surface of the optical assembly by cement or soldering. The tubing 708 is selected to have different TEC from that of optical assembly in order to produce changing stress in response to temperature change. The changing stress is designed to compensate for the isolation shift of the garnet with respect to temperature change. A ring magnet 710 is imposed on the outer circumference of the optical assembly to activate the garnet.

The invention may be applied to alter the optical characteristics of other optical devices, where such optical characteristics change in response to stress. Where such optical characteristic also changes in response to temperature, such temperature induced changes may be compensated for by applying stress in the manner described above. Such and other variations are within the scope of the invention.

FIG. 8 illustrates a tunable filter using piezoelectric actuator to produce stress on the optical assembly. A collar-shaped actuator 801 made of piezoelectric material is used to produce stress on the filter element 850. Optical assembly 810 comprising two GRIN lenses, 832 and 831, and filter element 850 is inserted through the piezoelectric actuator 801. Optical cements 842 and 841 are used to bond the filter element 850 to the end surfaces of the GRIN lenses 832 and 831. Adhesive, solder bond or welding bond as indicated by 820 is used to bond the optical assembly 810 to the inner surface of the actuator 801. Two electric leads 811 and 812 are connected to the actuator 801 to supply an appropriate voltage to it. As the voltage is changed, the actuator 801 is elongated or compressed in the longitudinal direction as indicated by the arrow 814. The compression or stretching of the actuator is propagated to the filter element through the bonding 820. This induces stress in the filter. The changing stress on the filter 850 produced by the changing voltage on the actuator 801 tunes the characteristic wavelength of the filter element 850. If desired, this shifting of frequency may be used to compensate for temperature induced wavelength shifts. Instead of using a piezoelectric member and applying voltage to it to apply stress to the filter or other optical device to alter its optical characteristic, it is also possible to do so by means of a member made of a magnetostrictive material and applying a magnetic field to it, such as by means of a current through a coil in the vicinity of the member. By controlling the current, an appropriate magnetic field may be applied to the member to control the amount of stress applied.

While the invention has been described above by reference to various embodiments, it will be understood that changes and modifications may be made without departing from the scope of the invention, which is to be defined only by the appended claims and their equivalents. Thus, where the embodiment described refers to applying stress to alter a characteristic frequency, it will be understood that these embodiments may be used to apply stress to optical devices to alter other optical characteristics as well; all such variations are within the scope of the invention.

What is claimed is:

1. An apparatus for filtering an optical signal, comprising;
    an optical interference filter having a characteristic frequency; and
    a device applying stress to the filter to compensate for effects of change of temperature on the characteristic frequency so that the characteristic frequency is less affected by temperature changes.

2. The apparatus of claim 1, said device applying a preload stress to the filter to alter its characteristic frequency.

3. The apparatus of claim 1, wherein said device applies compression to the filter when temperature of the filter increases and applies tension to the filter when temperature of the filter decreases.

4. The apparatus of claim 1, said filter having a temperature expansion coefficient, wherein said device includes a member having a temperature expansion coefficient that is different from that of the filter.

5. The apparatus of claim 4, said filter having a temperature expansion coefficient, wherein said device includes a member having a temperature expansion coefficient that is less than that of the filter.

6. The apparatus of claim 4, said filter having two sides, said apparatus further comprising a first and a second GRIN lens structure, each lens structure attached to one of the two sides of the filter, said device including a connector connecting the member to the GRIN lens structures.

7. The apparatus of claim 6, said connector including a first collar on or integral with the first lens structure, wherein said member is elongated and has an end abutting the first collar, said member adjustably connected to the second lens structure to apply stress to the filter through the structures.

8. The apparatus of claim 7, said connector further comprising a second collar on or integral with the second lens structure, said second collar defining a hole therein with a threaded surface, said member having a threaded portion for engaging the threaded surface to adjust the stress applied to the filter.

9. The apparatus of claim 6, said connector including a first collar on or integral with the first lens structure, said first collar having a hole therein and a far side facing away from the second lens structure, wherein said member is elongated and passes through said hole to engage said far side of the first collar, said member adjustably connected to the second lens structure to apply stress to the filter through the structures.

10. The apparatus of claim 9, said connector further comprising a second collar on or integral with the second lens structure, said second collar defining a hole therein with a threaded surface, said member having a threaded portion for engaging the threaded surface to adjust the stress applied to the filter.

11. The apparatus of claim 6, said member including a tube holding the filter and adjoining portions of the two lens structures.

12. The apparatus of claim 11, said connector including an adhesive, a solder or other metal material.

13. The apparatus of claim 11, wherein said tube applies a preloaded stress to the filter.

14. The apparatus of claim 1, said device applying stress to the filter by applying an electromagnetic parameter.

15. The apparatus of claim 14, said device comprising a piezoelectric member, and means for supplying a voltage to the member.

16. The apparatus of claim 1, wherein said filter is an etalon.

17. A method for filtering an optical signal, comprising;
providing an optical interference filter, said filter having a characteristic frequency;
causing change of stress in the filter, said causing including connecting a device to the filter to cause the change of stress; and
passing said optical signal through said filter, wherein said change of stress caused by the causing compensates for effects of change of temperature on the characteristic frequency so that the characteristic frequency is less affected by temperature changes.

18. The method of claim 17, said causing altering a characteristic frequency of the filter so that said characteristic frequency is of a desired value.

19. The method of claim 17, wherein said causing applies compression to the filter when temperature of the filter increases and applies tension to the filter when temperature of the filter decreases.

20. The method of claim 17, wherein said causing applies an electromagnetic parameter.

21. The apparatus of claim 20, wherein said connecting employs a piezoelectric member, and said applying applies a voltage to the member.

22. The apparatus of claim 1, said filter comprising thin films, wherein said device applies stress in a direction transverse to the thin films.

23. The method of claim 17, said filter comprising thin films, wherein said causing includes applying stress in a direction transverse to the thin films.

* * * * *